UNITED STATES PATENT OFFICE.

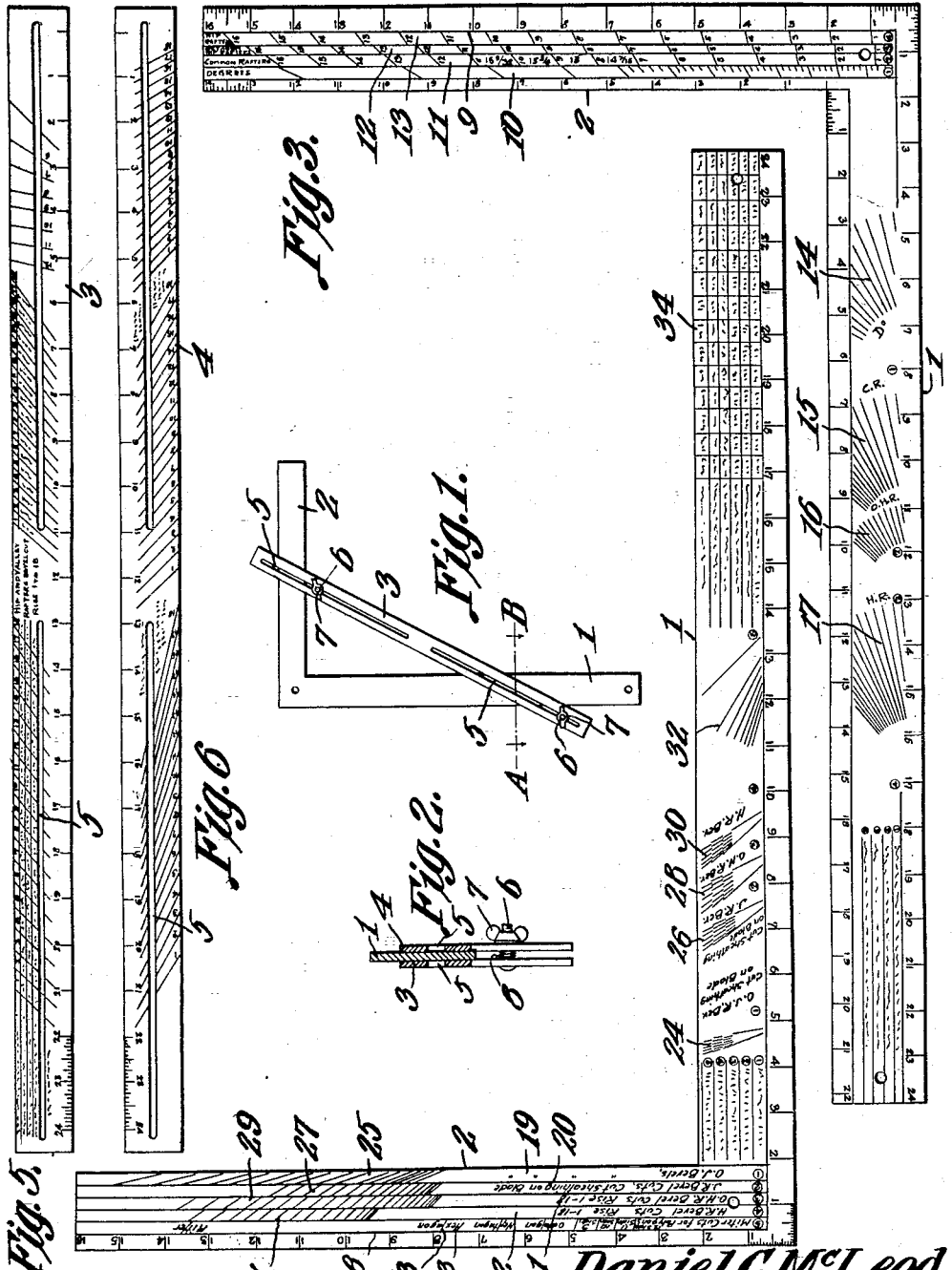

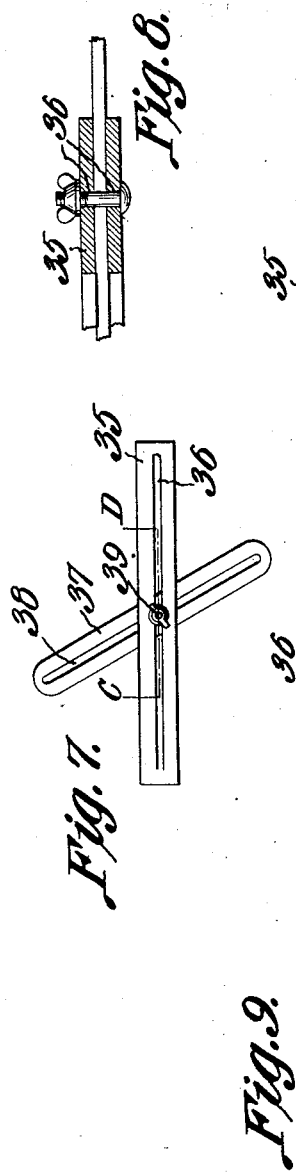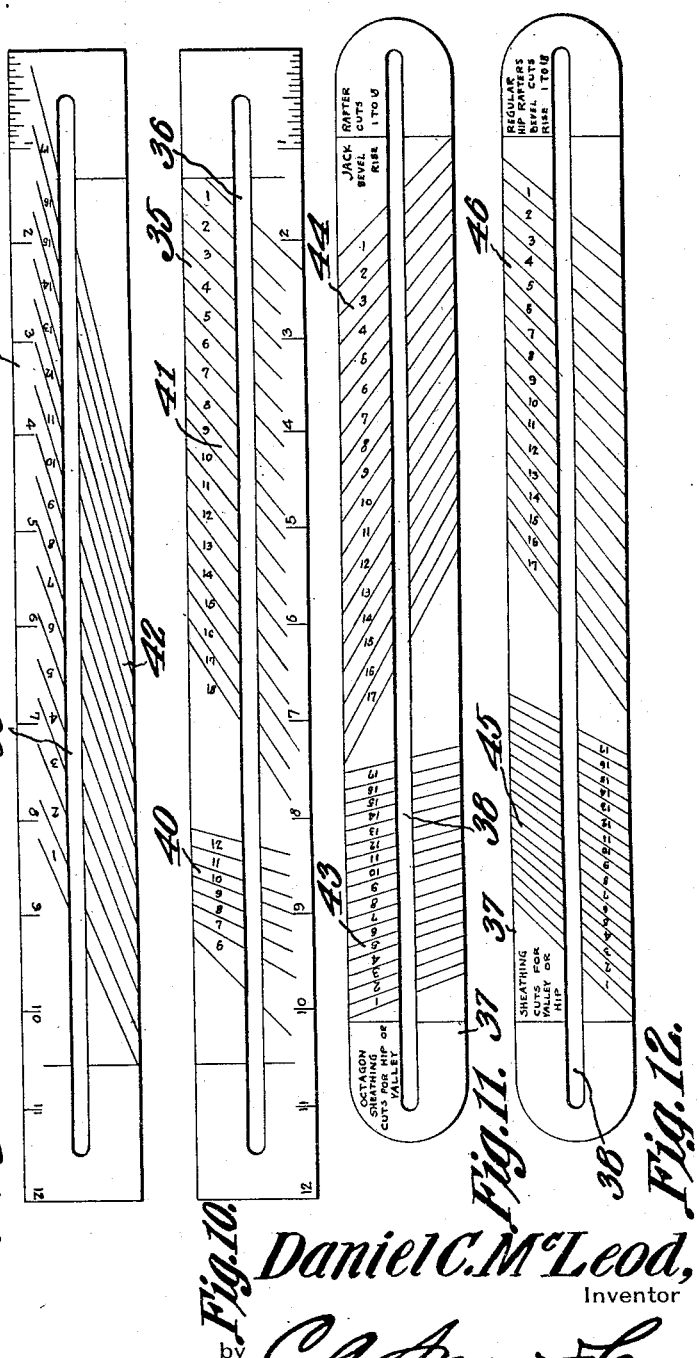

DANIEL C. McLEOD, OF CEDAR RAPIDS, IOWA.

FRAMING-TOOL.

1,189,983.    Specification of Letters Patent.    Patented July 4, 1916.

Application filed February 12, 1914. Serial No. 818,429.

*To all whom it may concern:*

Be it known that I, DANIEL C. MCLEOD, a citizen of the United States, residing at Cedar Rapids, in the county of Linn and State of Iowa, have invented a new and useful Framing-Tool, of which the following is a specification.

This invention relates to framing tools designed particularly for the purpose of simplifying the operations necessary in roof framing, brace framing, stair building and the like.

One of the objects is to provide coöperating members which can be quickly and accurately adjusted to predetermined positions relative to each other, whereby any one of a wide variety of cuts or bevels can be marked off upon the timbers to be cut and whereby such useful information as the length of the timbers can be determined accurately.

With the foregoing and other objects in view which will appear as the description proceeds, the invention resides in the combination and arrangement of parts and in the details of construction hereinafter described and claimed, it being understood that changes in the precise embodiment of the invention herein disclosed, can be made within the scope of what is claimed, without departing from the spirit of the invention.

In the accompanying drawings the preferred forms of the invention have been shown.

In said drawings:—Figure 1 is a plan view of the complete framing tool, the same being shown on a small scale and the various graduations and other marks of reference being removed. Fig. 2 is a section on line A—B Fig. 1. Fig. 3 is a plan view on an enlarged scale of the square constituting one member of the tool and showing the various graduations and other reference marks and the like on one side thereof. Fig. 4 is a similar view showing the other side of the square. Fig. 5 is a view showing one side of the two part rule. Fig. 6 is a view showing the opposite side of the two part rule. Fig. 7 is a plan view of a framing tool in the form of a bevel, the same being shown on a reduced scale and having all graduations and the like removed therefrom for the sake of clearness. Fig. 8 is an enlarged section on line C—D Fig. 7. Fig. 9 is a view of one of the outer faces of the stock of the tool shown in Figs. 7 and 8. Fig. 10 is a view of the opposite outer face of the stock. Figs. 11 and 12 are views of the opposite sides of the blade of the tool shown in Fig. 7.

Referring to the figures by characters of reference 1 designates the blade and 2 the tongue of a square and coöperating with this square are parallel rules 3 and 4 respectively each of which is provided with alining central longitudinal slots 5 spaced apart at the center of the rule and also spaced from the ends of the rule. Screws 6 are extended through the slots and carry binding nuts 7 or the like whereby after the blade and tongue of the square have been inserted between the rules 3 and 4, and said rules have been adjusted to any predetermined positions on the square, the rules can be caused to bind upon the square simply by tightening the nuts 7. Springs 8 may be mounted on the screws 6 for the purpose of spreading apart the rules when the nuts 7 are loosened, thus to permit the square to be inserted readily between the rules. It is to be understood that one or more of these springs can be used and that they can be placed in other positions than that described and illustrated, if so desired.

In order that the various desired results can be obtained by the use of the tool constituting the present invention, it is necessary that both sides of the square and that the outer sides of the rules be provided with graduations arranged in certain fixed relation to each other and properly designated. As shown in the drawings, both longitudinal edges of the blade and tongue of the square are graduated along one face to indicate inches and fractions thereof, the graduations along the outer edges of the blade and tongue beginning at the outer angle of the square while the graduations along the inner edges of the square begin at the inner angle. The inches are preferably designated by numerals, as shown.

Engraved or otherwise indicated upon the tongue 2 between the two graduated edges thereof and at one side only of the tongue are parallel lines 9 extending throughout the length of the tongue and partly across the blade 1, and forming parallel columns 10, 11, 12 and 13. Appearing in the outer end portion of the column 10 is the word "Degrees". In the outer end of the column 11 are the words "Common rafters". In the outer end of column 12 are the words "Octagon hip rafters". In the outer end of column 13 are the words "Hip rafters". The numeral 1 arranged within a circle is disposed within the inner end portion of column 10 while in the inner end portions of the columns 11, 12 and 13 are the numerals 2, 3 and 4, respectively, each being arranged within a circle. The various columns are intersected by graduations, those in the column 10 designating degrees and being arranged along lines radiating from the eight inch graduation along the outer graduated edge of the blade 1. A series of lines indicated at 14 is engraved or otherwise produced on the blade 1 and radiate from the said eight inch graduation and are designated preferably by the letter D and the degree symbol (°). Each of these radial lines 14 is in alinement with one of the graduations within the degree column 10.

Radiating from the twelve inch graduation along the outer longitudinal edge of the blade 1 are lines 15 disposed in alinement with corresponding graduations intersecting the column 11, these graduations being numbered consecutively from 1 to 16 or more, beginning at the inner end of the column. The group of lines 15 is preferably designated by the letters C R which are abbreviations of the words "Common rafters" appearing in column 11.

A third group of lines indicated at 16 on the blade 1, is provided, the lines of this group radiating from the thirteen inch graduation along the outer longitudinal edge of the blade 1 and each of these lines alining with a graduation intersecting the column 12. These graduations are numbered from 1 to 16 or more beginning at the inner end of the column and the group of lines 16 is designated preferably by the letters O H R, which constitute the first letters of the words "octagon hip rafters." Another group of lines indicated at 17 is arranged on the blade 1, these lines radiating from the seventeen inch graduation along the outer longitudinal edge of the blade 1 and each of the lines 17 alining with a graduation intersecting the column 13. This group 17 is designated preferably by the letters H R which are the first letters of the words "hip rafters." These graduations in column 13 are numbered from one to sixteen consecutively, beginning at the inner end of the column. Between the various graduations in the columns 11, 12 and 13, are arranged numerals indicating the "stretchout" or, in other words, numerals indicating the number of inches or fractions thereof to be laid out along a rafter for each foot of the base of the triangle of which the rafter constitutes the hypotenuse. The numerals in the columns and which designate the graduations, indicate the rise per foot in inches. Thus, if the rafter rises ten inches to the foot, the numeral appearing in the column 11 between the graduations designated by the numerals "19" and "10" will show that the "stretchout" is 15-5/8″. For the sake of clearness, all of the numerals appearing in the column 11 of a full size tool have not been shown but only as many as will be necessary in giving a complete explanation of the working of the tool.

In laying off "octagon hip rafters" and "hip rafters", the practice outlined above is followed with the exception that the rules 3 and 4 which are used in connection with the square, are shifted so as to register with the proper lines 16 or 17, as the case may be.

As above indicated, the rules 3 and 4 are to be used in connection with the square when the amount of rise and of "stretchout" is determined. These rules are also used at the same time for the purpose of laying off the proper bevels or cuts upon the rafters. For example, after the rules 3 and 4 have been set upon the square for the purpose of determining the stretchout of a common rafter having a rise of ten inches to the foot, the rules are laid along one edge of the rafter and a line drawn along the outer edge of tongue 2 to indicate the bevel at the upper end of the rafter and, along the outer edge of the blade 1 to indicate the bevel of the lower end of the rafter. These bevels are of course made at the distance apart determined by the "stretchout."

Engraved or otherwise formed on the blade 1 between the lines 17 and the free end of the blade may be suitable directions indicating how to place the rules on the square for the purpose of laying off the different bevels. The columns 10, 11, 12 and 13, as hereinbefore stated, have numerals 1, 2, 3 and 4, respectively, inclosed in circles. The directions on blade 1 having reference to the column 10 can be designated by a numeral 1 and those having reference to the columns 11, 12 and 13, can be designated by the numerals 2, 3 and 4, respectively, as shown. In view of the size of the drawings, it is not possible to reproduce the directions which appear upon the finished tool and as these directions constitute, in fact, no part of the present invention, it is not deemed necessary to reproduce them on the drawing. It might be stated, however, that the first line of the directions, indicated by the numeral 1, is preferably as follows—"Take 8 on blade. See degrees in column 1 on tongue." The second line of the directions and which is indicated by the numeral 2, is preferably as follows—"Take 12 on blade. See rise and stretchout in column 2 on tongue." The third line of the directions and which is indicated by the numeral 3, preferably reads "Take 13 on blade. See rise and stretchout in column 3 on tongue." The fourth line of directions and which is indicated by the numeral 4, preferably reads "Take 17 on blade. See rise and stretchout in column on tongue."

All of the graduations heretofore described are arranged upon one side of the square. The other side of the square is also formed with a novel arrangement of graduations. The outer longitudinal edges of the blade 1 and of the tongue 2 are graduated in inches and fractions thereof beginning at the angle of the square. Parallel lines 18 are engraved or otherwise formed along the blade 2 so as to divide it into parallel columns 19, 20, 21, 22 and 23. These columns extend throughout the length of the tongue 2 and partly across the blade 1. Engraved or otherwise indicated in the inner end portion of the column 23 is the numeral 5 in a circle and the words "Miter cuts for polygons". In the inner end portion of the column 22 appears the numeral 4 inclosed within a circle and the phrase "H. R. bevel cuts rise 1/18". In the third column, 21, at the inner end thereof, appears the numeral 3 within a circle, and the phrase "O. H. R. bevel cuts rise 1/18". In the inner end of column 20 appears the numeral 2 within a circle and the phrase "J. R. bevel cuts cut sheathing on blade". In the inner end of column 19 appears the numeral 1 within a circle and the phrase "O. J. bevels" and ditto marks under the words "Cut sheathing on blade" appearing in column 20.

Engraved or otherwise displayed on the blade 1 and close to the column 20 are five lines of instruction arranged in parallel relation, these lines being designated by the numerals 1, 2, 3, 4 and 5, each inclosed in a circle. These instructions inform the user where to place the rules in determing the various bevels and miter cuts referred to in the columns 19, 20, 21, 22 and 23. Because of the small space available in the drawing these instructions have not been set forth on the drawing. This is not deemed necessary, inasmuch as the wording of the instructions can be varied. It might be stated, however, that in tools such as actually constructed, the instructions indicated by the numeral 1 are "Take 5 on blade. Rise as marked on tongue. See lengths. Cut sheathing on blade." The instructions indicated by the numeral 2 are "Take 8 on blade. Rise as marked. See dif. J. R. lengths. Table. Cut sheathing on blade". The instructions indicated by the numeral 3 are "Take 9 on blade. Rise as marked on tongue." The instructions indicated by the numeral 4, are "Take 10 on blade. Rise as marked." The instructions indicated by the numeral 5, are "Take 14 on blade. Rise as marked".

Engraved or otherwise indicated on the blade 1 close to the five inch graduation is a group of lines designated by the numeral 24, these lines radiating from the five inch graduation and alining with diagonally disposed graduations 25 which interset the column 19. Furthermore the numeral 1 inclosed in a circle, is engraved or otherwise indicated on the blade close to the group 24 so that it will be apparent, at a glance, that these lines 24 are to be associated with the graduations appearing in the column in which the numeral 1 appears. Engraved or otherwise indicated upon the blade 1 close to the group 24 is the phrase "O. J. R. Bev. Cut sheathing on blade". Thus this group of lines is associated with the column 19 not only by the numerals 1 inclosed in circles but also by the phrase quoted.

Engraved or otherwise indicated on the blade 1 are lines 26 radiating from the eight inch graduation on the blade, these lines being designated by the phrase " Cut sheathing on blade" and "J. R. Bev." These lines aline with corresponding graduations 27 intersecting the column 20. A third group of lines 28 is formed on blade 1, these lines radiating from the nine inch graduation and being designated by the phrase "O. H. R. Bev." These lines aline with the corresponding graduations 29 intersecting the column 21. A fourth group of lines 30 is indicated on the blade 1, these lines radiating from the ten inch graduation and being designated by the phrase "H. R. Bev." These lines aline with graduations 31 intersecting column 22. A fifth group of lines 32 is formed on the blade 1, and these lines radiate from the fourteen inch graduation on the blade and aline with graduations 33 intersecting the column 23. These last named graduations 33 are in turn designated as follows, beginning with the inner one: "12 sides", "11 sides", "10 sides", "9 sides", "Octagon", "Heptagon", "Hexagon", "Miter". Not only are the various groups 26, 28, and 30, designated in the manner set forth, but they are also designated by the numerals 2, 3 and 4 respectively, arranged in circles, group 32 being likewise indicated by the numeral 5 inclosed in a circle.

It is thought that the use of the various lines and graduations will be apparent. By arranging the rule 3—4 upon any one of the lines on the blade 1 and extending it to the proper graduation on the tongue 2, the cut indicated can be marked off. For the purpose of ascertaining the "stretchout" or of quickly ascertaining any other facts relative to the tool a table can be engraved or otherwise laid out upon the blade 1, between the free end of the blade and the group 32, this table being designated at 34. Inasmuch as I do not restrict myself to any particular data to be set forth at this point, it is not deemed necessary to show any particular form of table.

As has already been set forth, the tongue and blade of the square are to be inserted between the rules 3 and 4. It will be noted that each of these rules has its outer face graduated. For example, the rule 3 has one edge graduated in inches and fractions thereof and provided further with graduations which can be used for ready reference in obtaining desired cuts or bevels. The same is likewise true of the rule 4. In making these rules it has been found desirable to indicate upon them miter cuts for regular polygons, hip and valley rafter bevel cuts for rises of one to 18 inches, jack rafter bevel cuts for rises of one to 18 inches, a table giving the differences in lengths of jack rafters spaced 16, 20 and 24 inches, octagon jack rafter bevel cuts, rises 1 to 18 inches; octagon hip rafter bevel cuts, rises 1 to 18 inches; and sheathing cuts for regular hips or valleys, for rises from 1 to 18 inches. It has been found that by the use of rules graduated in this manner, a carpenter or other mechanic can quickly determine various cuts and bevels. By using the rules upon the square, a pitch board for laying out stair work or other problems, can be quickly formed.

In Figs. 7 to 12 inclusive, a modified structure has been shown designed to be used in lieu of the square and rules shown in Figs. 1 to 6 inclusive. This modified form of tool is made up of a stock 35 having longitudinal slots 36, and a blade 37 extending through the stock and also formed with a longitudinal slot 38, the intersecting portions of the slots receiving a clamping screw 39, whereby blade 37 can be secured at any predetermined angle relative to the stock 35. Upon the outer faces of the stock 35 are engraved or otherwise indicated graduations for determining the cuts of octagon hip rafters, as at 40, rafter bevel cuts, rises from 1 to 18 inches, as indicated at 41, and octagon jack rafter cuts, rises from 1 to 18 inches, as shown at 42. The opposite sides of the blade 37 may be graduated so as to give octagon sheathing cuts for hips or valleys, as shown at 43, jack rafter bevel cuts, as shown at 44, sheathing cuts for valleys or hips, as shown at 45, and regular hip rafter bevel cuts as shown at 46. By adjusting the blade 37 to different positions relative to the stock 35, the cuts indicated by the graduations to which they are adjusted can be accurately laid out. It is to be understood that the tool shown in Figs. 7 to 12 can be used for any purpose to which an ordinary bevel can be put.

While the rules 3 and 4 hereinbefore described, are particularly designed for use in connection with the square shown in Figs. 3 and 4, it is to be understood that these rules can also be used in connection with a framing tool such as shown in Patent #1,050,969, issued to me on January 21, 1913. The rules can also be used in connection with any form of square in getting any required angles or in forming a pitch board for stair building.

By the term "stretchout" herein used is meant the increased length of each rafter as compared with the length of the base of the right angle triangle of which the rafter constitutes the hypotenuse.

What is claimed is:—

A framing tool including a square having groups of lines upon the blade, the lines of each group radiating from a common point, there being parallel columns upon the tongue of the square and having suitable designations, each column being intersected by lines alining with lines of one of the groups on the blade, parallel longitudinally slotted rules arranged upon opposite faces respectively of the square and engaging the blade and tongue thereof, means extending through the slots for binding the rules upon said faces of the blade and tongue to hold the rules against movement relative to the square, there being graduations upon the exposed faces of the rules indicating miter cuts.

In testimony that I claim the foregoing as my own, I have hereto affixed my signature in the presence of two witnesses.

DANIEL C. McLEOD.

Witnesses:
J. J. WAGNER,
W. B. REESE.

Copies of this patent may be obtained for five cents each, by addressing the "Commissioner of Patents, Washington, D. C."